United States Patent
Moon et al.

(10) Patent No.: US 9,818,100 B2
(45) Date of Patent: *Nov. 14, 2017

(54) METHOD AND SYSTEM FOR A MULTI-PURPOSE TRANSACTIONAL PLATFORM

(71) Applicant: CITICORP CREDIT SERVICES, INC. (USA), Long Island City, NY (US)

(72) Inventors: Susan Moon, New York, NY (US); Hugh Aller, Westhampton Beach, NY (US); Eric Yellin, New York, NY (US); Kellie Knox, Jacksonville, FL (US); Jeff Schumacher, Lake Forest, IL (US)

(73) Assignee: Citicorp Credit Services, Inc. (USA), Long Island City, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/851,647

(22) Filed: Mar. 27, 2013

(65) Prior Publication Data

US 2013/0218698 A1    Aug. 22, 2013

Related U.S. Application Data

(62) Division of application No. 10/411,192, filed on Apr. 11, 2003, now Pat. No. 8,412,623.

(Continued)

(51) Int. Cl.
*G06Q 20/10* (2012.01)
*G06Q 20/20* (2012.01)
(Continued)

(52) U.S. Cl.
CPC ........... *G06Q 20/227* (2013.01); *G06Q 20/04* (2013.01); *G06Q 20/10* (2013.01); *G06Q 20/18* (2013.01);
(Continued)

(58) Field of Classification Search
CPC ...... G06Q 20/40; G06Q 20/341; G06Q 20/10; G06Q 20/20
(Continued)

(56) References Cited

U.S. PATENT DOCUMENTS 3,376,661 A    4/1968 Hulett
3,399,473 A    9/1968 Jaffe
(Continued)

FOREIGN PATENT DOCUMENTS

DE    29713674 U1    9/1997
JP    3258596    11/1991
(Continued)

OTHER PUBLICATIONS

Office Action dated Aug. 11, 2015 corresponding to Brazilian Patent Application No. PI0312265-4, 10 pages, including English Translation of Office Action.

(Continued)

*Primary Examiner* — Shay S Glass
*Assistant Examiner* — Russell S Glass
(74) *Attorney, Agent, or Firm* — Eric L. Sophir; Dentons US LLP

(57) ABSTRACT

The present invention relates particularly to a method and system for consolidating a plurality of a consumer's payment and non-payment source accounts into a consolidated platform with a customer identification or available proxy account numbers that can be assigned to source accounts. The source accounts can be, for example, credit card accounts, ATM accounts, debit card accounts, demand deposit accounts, stored-value accounts, merchant-loyalty card accounts, membership accounts, and identification card numbers. The consumer can access and modify any of the source accounts and manage funds across the source (Continued)

accounts by accessing the consolidated platform with a single access device or mode.

21 Claims, 4 Drawing Sheets

Related U.S. Application Data

(60) Provisional application No. 60/395,606, filed on Jul. 15, 2002.

(51) Int. Cl.
  *G06Q 20/40* (2012.01)
  *G06Q 20/22* (2012.01)
  *G06Q 20/04* (2012.01)
  *G06Q 20/34* (2012.01)
  *G06Q 20/38* (2012.01)
  *G07F 7/10* (2006.01)
  *G06Q 20/18* (2012.01)

(52) U.S. Cl.
  CPC ......... *G06Q 20/341* (2013.01); *G06Q 20/357* (2013.01); *G06Q 20/385* (2013.01); *G07F 7/1008* (2013.01)

(58) Field of Classification Search
  USPC .......................................................... 705/64
  See application file for complete search history.

(56) References Cited

U.S. PATENT DOCUMENTS

| | | | |
|---|---|---|---|
| 4,091,448 A | 5/1978 | Clausing | |
| 4,443,027 A | 4/1984 | McNeely | |
| 4,634,848 A | 1/1987 | Shinohara et al. | |
| 4,700,055 A | 10/1987 | Kashkashian, Jr. | |
| 4,707,594 A | 11/1987 | Roth | |
| 4,797,542 A | 1/1989 | Hara | |
| 4,918,631 A | 4/1990 | Hara | |
| 5,025,372 A | 6/1991 | Burton et al. | |
| 5,276,311 A | 1/1994 | Hennige | |
| 5,326,964 A | 7/1994 | Risser | |
| 5,357,563 A | 10/1994 | Hamilton et al. | |
| 5,530,232 A | 6/1996 | Taylor et al. | |
| 5,544,246 A | 8/1996 | Mandelbaum | |
| 5,578,808 A | 11/1996 | Taylor | |
| 5,585,787 A | 12/1996 | Wallerstein | |
| 5,590,038 A | 12/1996 | Pitroda | |
| 5,627,355 A | 5/1997 | Rahman et al. | |
| 5,649,118 A * | 7/1997 | Carlisle et al. | ................. 705/41 |
| 5,770,843 A | 6/1998 | Rose et al. | |
| 5,794,234 A | 8/1998 | Church et al. | |
| 5,844,230 A | 12/1998 | Lalonde | |
| 5,859,419 A | 1/1999 | Wynn | |
| 5,883,377 A | 3/1999 | Chapin, Jr. | |
| 5,907,142 A | 5/1999 | Kelsey | |
| 6,000,608 A | 12/1999 | Dorf | |
| 6,024,286 A | 2/2000 | Bradley | |
| 6,032,136 A | 2/2000 | Brake, Jr. | |
| 6,089,451 A | 7/2000 | Krause | |
| 6,095,416 A | 8/2000 | Grant | |
| 6,131,811 A | 10/2000 | Gangi | |
| 6,182,895 B1 | 2/2001 | Albrecht | |
| 6,188,309 B1 | 2/2001 | Levine | |
| 6,189,787 B1 | 2/2001 | Dorf | |
| 6,266,647 B1 | 7/2001 | Fernandez | |
| 6,267,292 B1 | 7/2001 | Walker et al. | |
| 6,325,293 B1 | 12/2001 | Moreno | |
| 6,398,115 B2 | 6/2002 | Krause | |
| 6,402,029 B1 | 6/2002 | Gangi | |
| 6,427,909 B1 | 8/2002 | Barnes | |
| 6,494,367 B1 | 12/2002 | Zacharias | |
| 6,594,640 B1 | 7/2003 | Postrel | |
| 6,601,761 B1 | 8/2003 | Katis | |
| 6,820,061 B2 | 11/2004 | Postrel | |
| 6,829,586 B2 | 12/2004 | Postrel | |
| 6,842,739 B2 | 1/2005 | Postrel | |
| 6,847,935 B1 | 1/2005 | Soloman et al. | |
| 6,889,198 B2 | 5/2005 | Kawan | |
| 6,947,898 B2 | 9/2005 | Postrel | |
| 7,054,830 B1 | 5/2006 | Eggleston et al. | |
| 7,090,138 B2 | 8/2006 | Rettenmyer et al. | |
| 7,096,190 B2 | 8/2006 | Postrel | |
| 7,566,000 B2 | 7/2009 | Agostino et al. | |
| 7,996,288 B1 * | 8/2011 | Stolfo | ................... G06Q 20/04 |
| | | | 705/35 |
| 8,412,623 B2 * | 4/2013 | Moon et al. | ................... 705/39 |
| 8,682,791 B2 | 3/2014 | Bies et al. | |
| 2001/0001204 A1 | 5/2001 | Campisano | |
| 2001/0016827 A1 | 8/2001 | Fernandez | |
| 2001/0032134 A1 | 10/2001 | Hardesty | |
| 2002/0003169 A1 | 1/2002 | Cooper | |
| 2002/0029191 A1 | 3/2002 | Ishibashi | |
| 2002/0055909 A1 | 5/2002 | Fung et al. | |
| 2002/0123926 A1 | 9/2002 | Bushold et al. | |
| 2002/0152123 A1 | 10/2002 | Giordano et al. | |
| 2002/0161630 A1 | 10/2002 | Kern et al. | |
| 2002/0174055 A1 | 11/2002 | Dick et al. | |
| 2002/0188501 A1 | 12/2002 | Lefkowith | |
| 2002/0188511 A1 | 12/2002 | Johnson et al. | |
| 2002/0198803 A1 | 12/2002 | Rowe | |
| 2003/0115100 A1 | 6/2003 | Teicher | |
| 2003/0149625 A1 | 8/2003 | Leonardi et al. | |
| 2003/0171992 A1 | 9/2003 | Blagg et al. | |
| 2003/0212642 A1 | 11/2003 | Weller et al. | |
| 2003/0220834 A1 | 11/2003 | Leung et al. | |
| 2003/0229539 A1 | 12/2003 | Algeine | |
| 2004/0030601 A1 | 2/2004 | Pond et al. | |
| 2004/0122736 A1 | 6/2004 | Strock et al. | |
| 2004/0138999 A1 | 7/2004 | Friedman et al. | |
| 2004/0186770 A1 | 9/2004 | Pettit et al. | |
| 2004/0238622 A1 | 12/2004 | Freiberg | |
| 2005/0021399 A1 | 1/2005 | Postrel | |
| 2005/0021400 A1 | 1/2005 | Postrel | |
| 2005/0021401 A1 | 1/2005 | Postrel | |
| 2005/0065819 A1 | 3/2005 | Schultz | |
| 2005/0086167 A1 | 4/2005 | Brake, Jr. et al. | |
| 2005/0107155 A1 | 5/2005 | Potts et al. | |
| 2005/0149394 A1 | 7/2005 | Postrel | |
| 2005/0251446 A1 | 11/2005 | Jiang et al. | |
| 2006/0129426 A1 | 6/2006 | Pearson | |
| 2006/0129427 A1 | 6/2006 | Wennberg | |
| 2006/0161478 A1 | 7/2006 | Turner et al. | |
| 2006/0184419 A1 | 8/2006 | Postrel | |
| 2006/0195359 A1 | 8/2006 | Robinson et al. | |
| 2006/0208064 A1 | 9/2006 | Mendelovich et al. | |
| 2006/0224451 A1 | 10/2006 | Kerschbrock et al. | |
| 2006/0249575 A1 | 11/2006 | Turner et al. | |
| 2006/0253320 A1 | 11/2006 | Heywood | |
| 2006/0259362 A1 | 11/2006 | Cates | |
| 2006/0259364 A1 | 11/2006 | Strock et al. | |
| 2007/0005403 A1 | 1/2007 | Kennedy et al. | |
| 2007/0106607 A1 | 5/2007 | Seib et al. | |
| 2007/0198432 A1 | 8/2007 | Pitroda et al. | |
| 2008/0010096 A1 | 1/2008 | Patterson et al. | |
| 2008/0065554 A1 * | 3/2008 | Hogan et al. | ................... 705/64 |
| 2008/0177574 A1 | 7/2008 | Gonzalez et al. | |
| 2010/0010909 A1 | 1/2010 | Marshall et al. | |

FOREIGN PATENT DOCUMENTS

| | | |
|---|---|---|
| JP | 10-302160 | 11/1998 |
| JP | 2000-259876 | 9/2000 |
| JP | 2001-243350 | 9/2001 |
| JP | 2002-032686 | 1/2002 |
| JP | 2002-083145 | 3/2002 |
| JP | 2002157631 | 5/2002 |
| JP | 2008-545210 | 12/2008 |
| KR | 2002-0045301 | 6/2002 |
| KR | 10-0457099 | 11/2004 |
| WO | 99/16030 A1 | 4/1999 |
| WO | 0129789 A1 | 4/2001 |

(56) References Cited

FOREIGN PATENT DOCUMENTS

| WO | WO 2001/29789 | 4/2001 |
| WO | WO 2001/69556 | 9/2001 |
| WO | WO 2007/005021 | 1/2007 |

OTHER PUBLICATIONS

Australian Patent Examination Report No. 2 in Australian Patent Application No. 2012261618, dated Jun. 19, 2015, 7 pages.
Australian Office Action dated Mar. 9, 2011 in related Application No. 2010212457, 2 pages.
Beason, PrivaSys Introduces PIN-Driven Secure Card Technology, PR Newswire, 2001, 2 pages.
Beason, PrivaSys Launches Interactive, Electronic Secure Card and is Chosen for the Prestigious Hot seat at Demo 2002, PR Newswire, 2002, 2 pages.
Chinese First Office Action dated Jan. 9, 2009 in related Application No. 03815523.0, includes English Translation, 8 pages.
Chinese Second Office Action dated Jun. 26, 2009 in related Application No. 03815523.0, includes English Translation, 14 pages.
Chinese Third Office Action dated Feb. 5, 2010 in related Application No. 03815523.0, includes English Summary, 6 pages.
DE29713674 published Sep. 25, 1997, Abstract only in English , 1 page.
European Communication dated Mar. 11, 2009 in related Application No. 03764643.7, 8 pages.
European Communication dated Oct. 15, 2009 in related Application No. 03764643.7, 13 pages.
European Communication dated Aug. 23, 2007 in related Application No. 03764643.7, 6 pages.
Givewell.com—Give the Gift of Health: The Prepaid Debit Card, a Highmark Product, 2007, downloaded from the Internet on Oct. 17, 2011, at http://web.archive.org/web/20071104124914/http://givewell.org/how-it-works/, 3 pages.
International Preliminary Examination Report dated Jan. 6, 2006 in related Application No. PCT/US03/22018 filed Jul. 15, 2003, 2 pages.
International Search Report dated Nov. 5, 2004 in related Application No. PCT/US03/22018 filed Jul. 15, 2003, 4 pages.
International Search Report dated Feb. 24, 2010 in related Application No. PCT/US2010/045445 filed Aug. 13, 2010, 4 pages.
International Search Report dated Mar. 29, 2011 in related Application No. PCT/US2010/45500 filed Aug. 13, 2010, 3 pages.
JP3258596 published Nov. 18, 1991, abstract only in English, downloaded from esp@enet.com, 1 page.
JP1998-302160 (JP 10-302160) published Nov. 13, 1998, abstract only in English, downloaded from PAJ, 1 page.
JP2000-259876 published Sep. 22, 2000, abstract only in English, downloaded from esp@enet.com, 1 page.
JP2001-243350 published Sep. 7, 2001, abstract only in English, downloaded from esp@enet.com, 1 page.
JP2002-032686 published Jan. 31, 2002, abstract only in English, downloaded from PAJ, 1 page.
JP2002-083145 published Mar. 22, 2002, abstract only in English, downloaded from PAJ, 1 page.
JP2002-157631 published May 31, 2005, English translation, abstract downloaded from PAJ, complete English translation obtained from JPO, 23 pages.
Japanese Office Action in related Application No. 2004-521813 with English language translation, dated Apr. 28, 2009, 4 pages.
Korean Office Action dated May 18, 2010 in related Application No. 10-2004-7020962, includes English translation, 11 pages.
KR 2002-0045301 published Jun. 19, 2002, English language translation, 9 pages.
KR 10-0457099 published Nov. 16, 2004, English language translation, 12 pages.
Kutler, Is banking finally ready for smart cards?, American Banker, 1992, vol. 157, No. 129, 5 pages.
Novartis Vaccines Launches National Gift-Giving Program to Help Protect Loved Ones by Reserving an Influenza Vaccination, PR Newswire, Cambridge, Mass, 2007, 4 pages.
Philippine Office Action in English dated Nov. 7, 2006 in related Application No. 12004502096 filed Dec. 21, 2004, 2 pages.
Philippine Office Action in English dated May 19, 2009 in related Application No. 12004502096 filed Dec. 21, 2004, 2 pages.
Polish Office Action English summary dated Feb. 5, 2010, in related Application No. 374297, 2 pages.
Polish Office Action English Summary dated Apr. 7, 2009, in related Application No. 374297, 2 pages.
Polish Office Action English Summary dated Aug. 28, 2008, in related Application No. 374297, 2 pages.
Quail Creek Bank Personnel, Rates, http://web.archive.org/web/20000305204031/http://quailcreekbank.com/rates.html, Mar. 5, 2000, pp. 1-3.
Redman, CVS Offers Prepaid Health Cards in Florida Stores, Chain Drug Review, 2009, 1 page.
Redman, Winn-Dixie Rolls Out Prepaid Health Insurance Cards, Chain Drug Review, 2009, 1 page.
Ruddock, One card versus multiple card products, Business Credit, 2000, vol. 12, No. 5, 8 pages.
Supplemental European Search Report for Application No. EP 03764643, dated Aug. 11, 2006, 3 pages.
Weinstein, Plastic Card Industry Faces a Forked Road: User Security and New Services Will Steer Course of Electronic Funds Transfers, American Banker, 1984, 6 pages.

* cited by examiner

METHOD AND SYSTEM FOR A MULTI-PURPOSE TRANSACTIONAL PLATFORM

PRIORITY

This application is a divisional of U.S. patent application Ser. No. 10/411,192, now U.S. Pat. No. 8,412,623, titled "METHOD AND SYSTEM FOR A MULTI-PURPOSE TRANSACTIONAL PLATFORM," filed Apr. 11, 2003, which claims the benefit of U.S. Provisional Patent Application Ser. No. 60/395,606, titled "METHOD AND SYSTEM FOR A MULTI-PURPOSE TRANSACTIONAL PLATFORM," filed Jul. 15, 2002, all of which are herein incorporated by reference in their entirety.

BACKGROUND OF THE INVENTION

Field of the Invention

The present invention relates to the field of consumer accounts, business accounts, and other account types. More particularly, the present invention relates to a method and system for linking source accounts of, for example, demand deposit accounts (DDAs), credit cards, debit cards, stored value cards, ATM cards, loyalty cards, membership cards, and identification cards to a single account platform. This platform and all its linked source accounts can be accessed by a number of potential remote access devices.

Description of the Related Art

The ever-bulging wallet is a guaranteed phenomenon in modern-day society. As one traverses through life, one will undoubtedly accumulate numerous things for the wallet. One of those things is the ubiquitous "plastic" in the form of, for example, a credit card, debit card, stored value card, ATM card, phone card, or all of the above. The average consumer has multiple bankcards, private label cards (such as store credit cards, oil/gas credit cards), stored value cards, loyalty cards, membership cards, and identification cards that he/she may carry around. The proliferation of these cards and their associated accounts is adding complexity and inconvenience to consumers' financial lives.

BRIEF SUMMARY OF THE INVENTION

There exists a need for a vehicle that enables wallet consolidation and facilitates management across a plurality of consumer payment and non-payment accounts provided by one or more issuing entities.

Accordingly, the preferred embodiments of the present invention provide a method and system that eliminate the need for multiple cards in a consumer's wallet by linking the consumer's payment cards such as credit card(s), debit card(s), stored value card(s) (e.g., subway/metro cards), and ATM card(s), and the consumer's non-payment cards such as loyalty card(s) (e.g., supermarket or drugstore reward program cards), membership card(s) (e.g., video rental and warehouse club cards), and identification card(s) to one consolidated platform that can easily be accessed.

The preferred embodiments of the present invention also provide a method and system for managing funds, through the consolidated platform, across all linked source accounts from various institutions.

The preferred embodiments of the present invention also provide a method and system that give consumers an easy way to access the funds they want to use for any purchase by combining all their payment choices in a single access device or mode, such as a "plastic" card, a phone (cellular or landline), personal digital assistant (PDA), biometric identification (ID), etc.

The preferred embodiments of the present invention further provide a method and system for a multi-purpose device for accessing multiple source accounts via a consolidated platform, and a consumer using such device can choose which payment method the consumer wants to use for a particular transaction. For instance, the consumer can simply input the desired payment choice via a device that accesses his/her source accounts through the consolidated platform.

The preferred embodiments of the present invention also provide a method and system for a multi-purpose accessing device, wherein the consumer having such device has the ability to access and modify personal account information anywhere, anytime from a phone or a data network such as the Internet, so the consumer has the ultimate decision in using the transaction method(s) and/or account(s) that are right for the consumer.

The preferred embodiments of the present invention also provide a method and system for a consolidated platform that links to one or more underlying source accounts, wherein each underlying source account is represented by a proxy account number. Multiple proxy account numbers can be pre-loaded onto a device used for accessing the consolidated platform and the underlying source accounts, wherein each number can remain dormant or be activated to associate with one or more of the underlying source accounts.

DETAILED DESCRIPTION OF THE INVENTION

Figure 1:
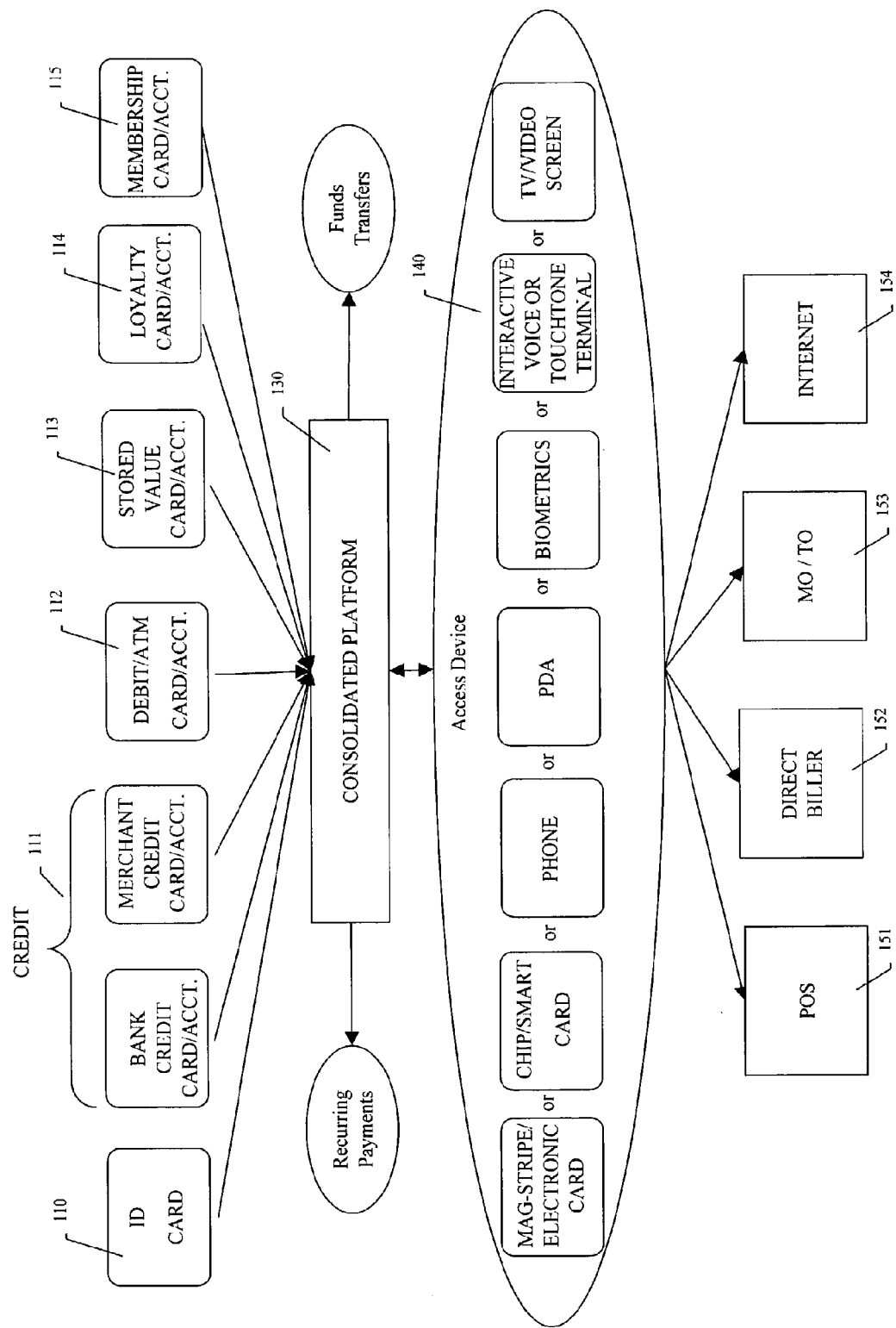
FIG. 1 depicts a system and method for a consolidated platform in accordance with an embodiment of the present invention.

Reference is now made in detail to a preferred embodiment of the present invention, an illustrative example of which is depicted in FIG. 1, showing a system and method for consolidating and accessing consumer payment and non-payment accounts. The term "consumer" or "customer" used herein can be an individual, a group of individuals, a company, or any other entities acting together as one.

According to an embodiment of the present invention, a host entity (e.g., a financial institution) may provide any of its customers with a consolidated platform 130 that may be linked to multiple customer relationships or source accounts that are normally accessed individually by cards or other means. The cards can be, for example, identification card(s) 110, credit card(s) 111, debit/ATM card(s) 112, stored value card(s) 113, loyalty card(s) 114, and/or membership card(s) 115. The source accounts can be provided by one or more account issuers, wherein the host entity can be one of the account issuers. A consumer can access any of his/her source accounts through a single access device or mode 140, such as a "plastic" card, a phone (cellular or landline), PDA, biometric ID, etc. for a transaction at a point-of-sale (POS) or point-of-access (POA) terminal 151, for a mail order (MO) or telephone order (TO) transaction 153, for an Internet transaction 154, or for a payment to a direct biller 152. As their names imply, the POS and POA terminals can be, for example, a card reader at the point of sale such as a supermarket check-out counter, a computer terminal coupled to a communication network for making transactions on-line or accessing accounts, or a telephone for making MO/TO transactions or accessing accounts using voice and/or touchtone signalings.

The host entity and/or each customer may initiate the linking process in order to set up the consolidated platform. A customer wishing to sign up can contact the host entity via telephone, Internet, or any other means of communication that can convey the customer's wish to the host entity. In this interaction, the customer may be prompted to register each source account by providing each source account number, the account issuer of the source account, and any other relevant information relating to the source account that can be used to link it to the consolidated platform. For instance, once contacted by the customer to set up a consolidated platform, the host entity can offer to automatically register all host entity-branded accounts and/or other accounts affiliated with or issued by the host entity. Next, the host entity can prompt the customer to register other accounts not branded or affiliated with the host entity. The host entity can also prompt the customer to select one of the registered accounts as the default account to be used for a transaction when no account choice is made or possible for such transaction.

Figure 2:
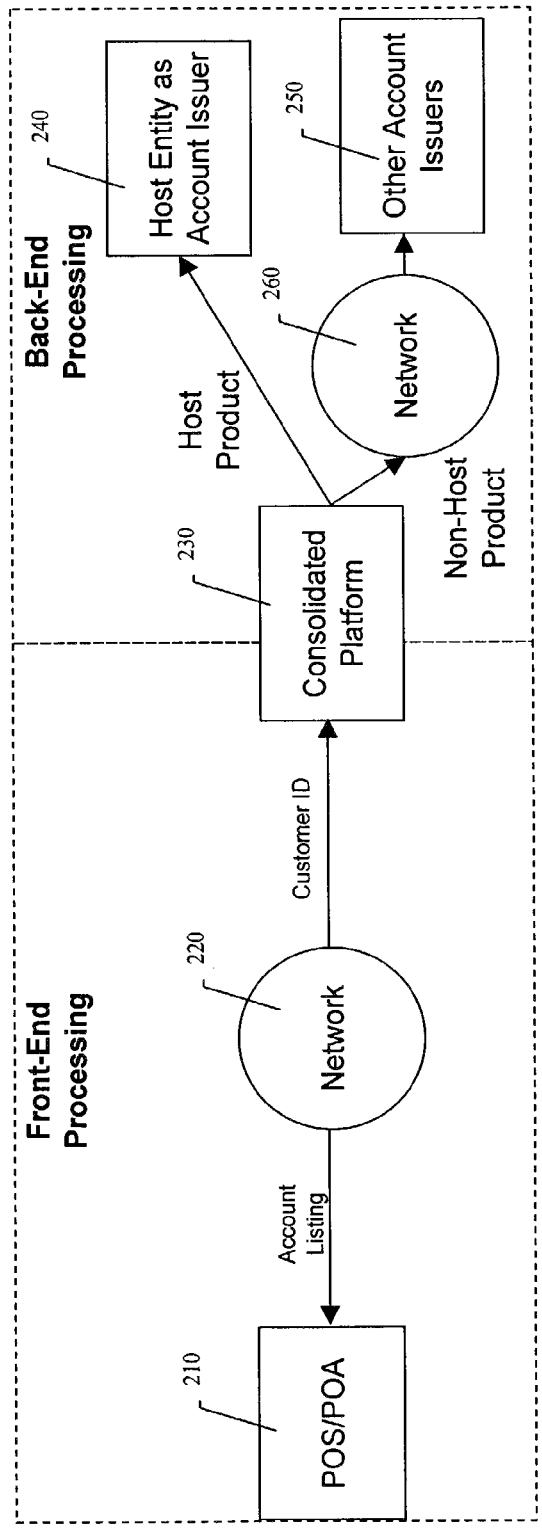
FIG. 2 depicts a high-level diagram of the functionality of a consolidated platform that employs a customer identification to access underlying accounts, in accordance with an embodiment of the present invention.

According to the preferred embodiments of the present invention, the host entity can set up the consolidated platform by creating such platform and an associated identifier that links to one or more of the customer's various source accounts. In an embodiment, the associated identifier can be a customer identification (ID) assigned to each customer. The customer ID enables the consolidated platform of the present invention to identify the particular customer and activate the customer's account listing for selection. The account selection can be dependent on technology advancement at point of sale (POS) or point of access (POA) that allows for account selection. The associated account number can also include a unique bank identification number (BIN) to indicate that it is a consolidated platform number of the present invention. FIG. 2 provides a high-level depiction of the functionality of a consolidated platform that employs a customer ID number to access various underlying accounts. Here, the customer can use an access device to communicate the customer ID to a POS or POA terminal 210 for a transaction. The customer also can directly enter the customer ID into an input device (e.g., a keypad) located at the POS/POA terminal 210 without using an access device. The POS/POA terminal 210 then relays the customer ID to a participating terminal or payment network 220, which identifies the customer ID as being associated with the consolidated platform and routes it to the consolidated platform 230 maintained by the host entity. Based on the customer ID, the consolidated platform 230 returns an associated account listing, such as the one shown in Table 1, to the customer at the POS/POA terminal 210 via the network 220. The customer can then select an account from the account listing using the input device at the POS/POA terminal 210, which relays the account selection to the consolidated platform 230 via the network 220.

Alternatively, the customer can communicate both the customer ID and information about a selected account (again, via an access device or an input device located at the POS/POA terminal 210) without having to receive the account listing from the consolidated platform 230 for account selection. It should be noted that the customer ID can be set up as desired by the host entity to have any number of characters, and each character can be any alphabet letter, numeric character, or symbol.

TABLE 1

Customer ID-based Account Table

| ID | Accounts | Institution |
| --- | --- | --- |
| 1234 = B. Smith | 1. Debit - 7890 | Bank X |
| | 2. Credit - 2121 | Bank Y |
| | 3. Credit - 3333 | Bank Z |

Through the consolidated platform 230, the host entity can approve/authorize the transaction and settle the transaction internally when the selected account is administered by the host entity at system 240. In this case, the consolidated platform 230 and the system 240 can be parts of the host entity's host processing system, which can include processing units, databases and/or servers to process information received from the POS/POA terminal in a manner apparent to those skilled in the art based on the present disclosure. If the selected account is administered by an external entity other than the host entity at system 250, such as another financial institution (FI), the host entity can settle the transaction externally via a network 260, such as the Automated Clearing House (ACH), executed against the selected account of an external account issuer. As understood in the art, the ACH makes periodic sweeps against external account issuers to clear respective selected accounts passed on by the consolidated platform 230. Settlement networks other than the ACH, e.g., MasterCard, Visa, AmEx, Discover, Diner's Club) can also be set up and/or used for authorization, settlement and/or clearance of funds between accounts, and they can be the same or different from the network 220 that was used to initiate the transaction. The host entity can also directly settle the transaction with an external account issuer if the host entity and the external account issuer have direct contacts and/or agreements with one another.

Figure 3:
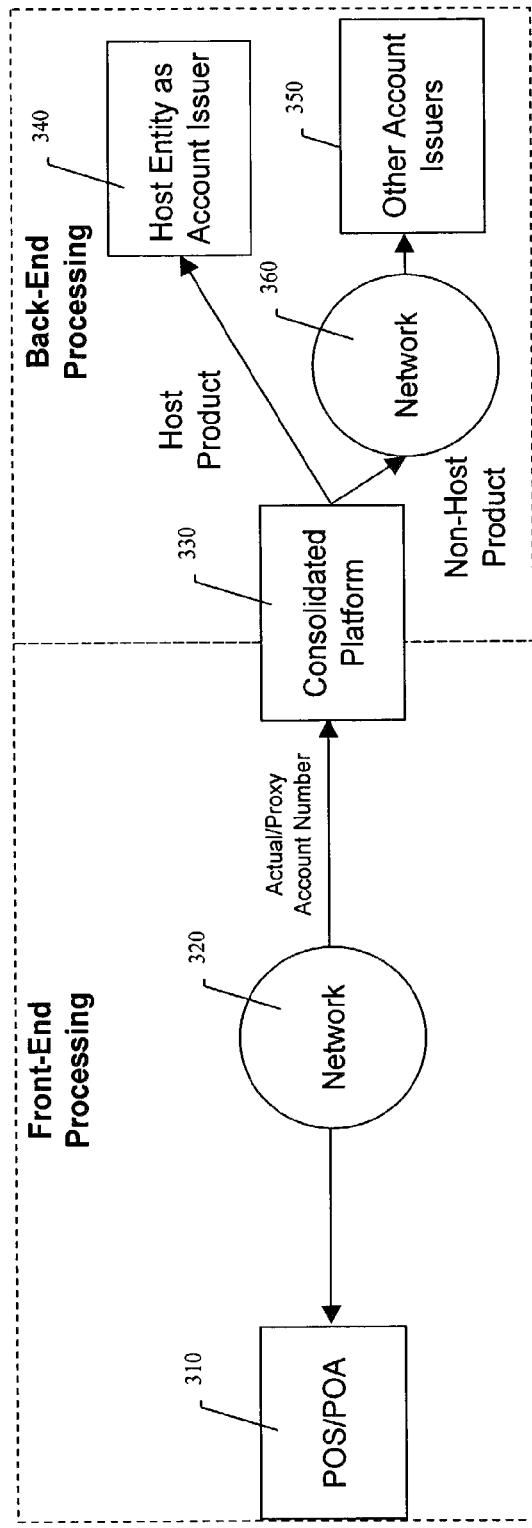
FIG. 3 depicts a high-level diagram of the functionality of a consolidated platform that employs actual or proxy (actual/proxy) account numbers to access underlying accounts, in accordance with an embodiment of the present invention.

Alternative to the customer-ID based consolidated platform, within the consolidated platform the host entity can associate each underlying source account with an identifier that can be the source account's actual account number or a representative proxy account number. In this embodiment, the associated identifier represents a particular one of the underlying source accounts and not the particular customer having those underlying source accounts. Again, the actual/proxy account number can have a credit or checking/debit BIN number, depending on the type of underlying account and access device design, to identify it as an actual/proxy account number of a consolidated platform. FIG. 3 provides a high-level depiction of the functionality of a consolidated platform that employs actual/proxy account numbers to access various underlying accounts, in accordance with an embodiment of the present invention. Here, the customer can use an access device to communicate the actual or proxy account number to the POS/POA terminal 310 for a transaction. The customer also can directly enter the actual/proxy account number into an input device (e.g., a keypad) located at the POS/POA terminal 310 without using an access device. The POS/POA terminal 310 then relays the actual/proxy account number to a participating terminal or payment network 320, which identifies the account as part of a consolidated platform and routes it to the consolidated platform 330 maintained by the host entity. The terminal/payment network 320 can be an industry-standard terminal/payment network (e.g., Visa, MasterCard, AmEx, Discover, Diner's Club, NYCE, Star), and the actual/proxy account number can be compatible with such network.

If the consolidated platform 330 receives from the network 320 a host-issued actual account number, the consolidated platform 330 can authorize the transaction and route the settlement of the actual account number internally within the host entity's system at 340. If the consolidated platform 330 receives from the network 320 an actual account number that is issued by an external entity other than the host entity, the consolidated platform 330 can route the account number and transaction information to the external account issuer for settlement via any external network 360 that is typically used by the external account issuer (e.g., Visa, MasterCard, AmEx, Discover, Diner's Club, NYCE, Star). Alternatively, the network 320 can receive an actual account number that is issued by an external entity other than the host entity, bypass the consolidated platform 330, and route the actual account number and transaction information to the external account issuer 350 for settlement.

If the consolidated platform 330 receives a proxy account number, it first performs a proxy account matching using a proxy account matching table, such as the one shown in Table 2, to obtain the actual source account number. It should be noted that the proxy account number can be set up as desired by the host entity to have any number of characters, and each character can be any alphabet letter, numeric character, or symbol. Once the matching is completed, the consolidated platform 330 can authorize the transaction and route the settlement of the actual account number internally within the host entity's system 340 or externally at 350 with a settlement network 360 as described earlier.

TABLE 2

Proxy Account Matching Table

| Proxy | Source Account | Institution |
|-------|---------------|-------------|
| 1212 = | 5389 | Host entity |
| 1234 = | 7890 | Bank X |
| 4567 = | 7889 | Bank Y |

The settlement network 360 can be the same or different from the network 320 that was used to initiate the transaction. Also, the consolidated platform 330 and the system 340 can be parts of the host entity's host processing system, which can include processing units, databases and/or servers to process information received from the POS/POA terminal in a manner apparent to those skilled in the art based on the present disclosure.

The preferred embodiments of the present invention anticipate that a variety of access devices may be used to access the consolidated platform and its underlying source accounts via communication networks such as the Internet or other data networks. One advantage of the use of customer ID and actual/proxy account numbers is that they can be used on a variety of devices as such devices are adopted over time by the customers for transactions (e.g., at POS). In other words, the customer ID and actual/proxy account numbering schemes can be independent of the type of access device used. Possible access devices or mechanisms include but are not limited to: computer terminals, landline phones, cellular phones, PDAs, magnetic-stripe cards (e.g., electronic card device or card with multiple magnetic stripes), chip cards (i.e., smart cards), biometric ID technology, televisions, touch screens, video terminals, and interactive voice and/or touchtone terminals. The customer ID and actual/proxy account numbers can be pre-loaded onto, for example, payment applications residing in any of these access devices, and each proxy account number can be linked within the host entity's system to any underlying source account through the consolidated platform.

When the access device is a computer terminal, a landline or cellular phone, a PDA, a chip card or any other electronic storage device, the customer can enter the customer ID or actual/proxy account number into such access device (or retrieve the number if it already has been entered and stored in the access device) for transmission to the consolidated platform in transaction settlements. The customer can enter the particular customer ID or actual/proxy account number with a keyboard or keypad associated with the access device. Here, the access device and the POS/POA terminal can be one and the same; for example, a customer using a computer terminal to purchase products on-line with the customer ID or actual/proxy account number entered or stored therein. The information transmission to the consolidated platform can be done at the POS/POA terminal, through the Internet or another data network, using landline (wired) or wireless (e.g., infra-red or radio-frequency) communication as understood in the art.

Figure 4:
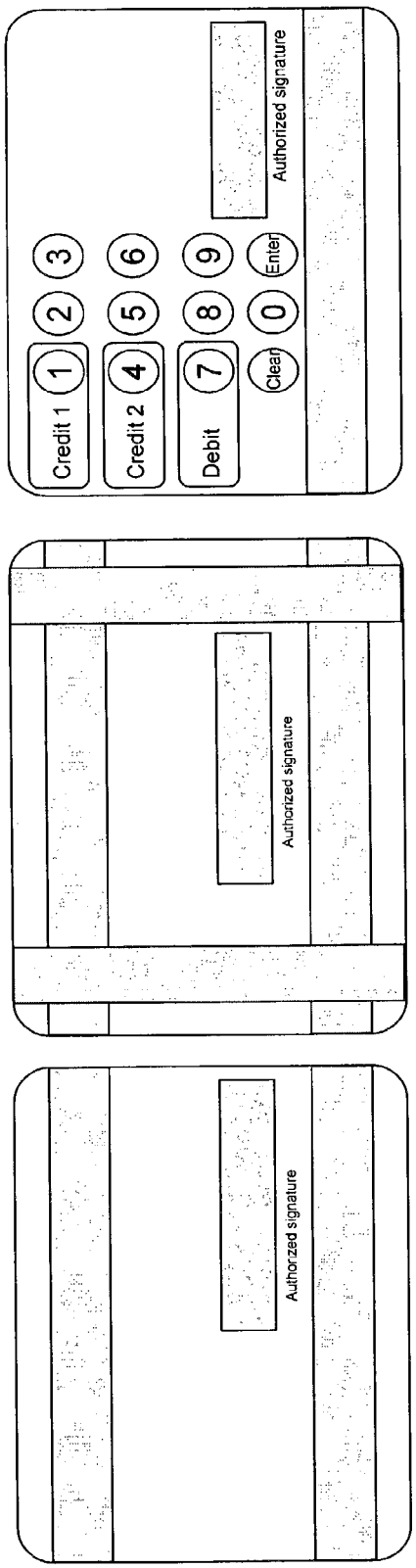
FIGS. 4A-C depict different cards as possible access devices for the consolidated platform, in accordance with an embodiment of the present invention.

When the access device is a magnetic-stripe card, the customer can store the customer ID or actual/proxy account numbers on the card, which can be swiped at a POS/POA terminal for transmission of such numbers to the consolidated platform in transaction settlements. For storage of a customer ID number, the magnetic-stripe card can have a single magnetic stripe that stores the customer ID number in a typical manner known in the art for conventional credit cards, ATM/debit cards, and the like. For storage of a plurality of actual/proxy account numbers, the magnetic-stripe card can have a plurality of magnetic-stripes arranged at different locations on the card. Each magnetic stripe stores a particular actual/proxy account number, and the customer can choose a particular account number to use for a transaction by swiping the corresponding magnetic stripe on the card at the POS/POA terminal. FIGS. 4A and 4B show examples of a card having two magnetic stripes and a card having four magnetic stripes, respectively, that can be used in the present invention. Alternatively, the magnetic stripe card can have a single magnetic area at a single location on the card and associated electronics for magnetic simulation or dynamic magnetic encoding that enables the card to output different actual/proxy account numbers or a customer ID (with or without different link data to indicate a chosen account number) at the POS/POA terminal. FIG. 4C shows an example of the card. With such card, the customer can choose a particular account number to use for a transaction by entering the account choice via a keypad or switch(es) located on the card itself, and the magnetic area can output the corresponding account number at the POS/POA terminal.

When the access device employs biometric ID technology, the customer ID can be based on a biometric scan, such as a fingerprint scan or an iris scan. Such biometric technology is as understood in the art. Thus, the customer can access an account list from the consolidated platform or further enter an account selection in the access device or in an input device at the POS/POA terminal in order to perform a transaction by first providing a biometric scan at a POS/POA terminal during the transaction.

As mentioned earlier, the consolidated platform provides the matching capability so that when the host entity receives a transaction through or performed with one of the proxy account numbers, that number will be matched/associated with an underlying source account against which the host entity can execute settlement.

Another advantage of proxy account numbers is the elimination of the need to replace cards. Because multiple proxy account numbers can be pre-loaded onto each access device, some numbers can be activated while some remain dormant on the access device. Hence, when the customer changes or adds one or more of the underlying source accounts, such modification can be changed in the host entity's system by reassigning, activating, and/or deactivating the pre-loaded proxy account numbers to match the newly-amended underlying source accounts. Still another advantage of proxy account numbers is the ease with which a customer can obtain a consolidated platform for access to multiple other accounts. This is because the customer only has to provide information about source accounts to be linked, and the set-up can be performed by the host entity.

According to the preferred embodiments of the present invention, a customer can choose a desired payment method at a POS terminal (or a point-of-access terminal) via the access device. There are at least three choices of payment that the access device can have: 1) credit, 2) checking non-cash back, and 3) checking with ATM/cash-back. Credit represents lines of credit and their proxy account numbers, and the customer can select a particular credit account from one or more lines of credit available to him/her for credit payments. These credit accounts have corresponding credit proxy account numbers that are pre-loaded onto the access device as explained earlier. The access device will then send the corresponding credit proxy account number (with credit BIN) to the POS terminal. This transaction can be processed by the terminal and payment networks (e.g., MasterCard, Visa, AmEx, Discover, Diner's Club) as credit transactions are conventionally processed. The host entity then receives from the payment networks the transaction for authorization and settles based on the normal authorization criteria for the source account that corresponds to the credit proxy account. The settlement can be done internally within the host entity's system or externally through an outside settlement network as described below.

Another payment method, checking non-cash back, represents a transaction against a checking account when no cash back is received, wherein a proxy account number can be used for the checking account. Hence, for a checking transaction at a POS or POA where cash-back is not received, the access device can send a corresponding checking proxy number with a credit BIN to the POS terminal. Again, the corresponding checking proxy account number is pre-loaded onto the access device as explained earlier. This transaction can be processed in a similar manner to an off-line (i.e., signature-based) debit transaction, and it is then routed to the host entity for settlement. The host entity can approve and settle the transaction internally or externally as described earlier.

Another payment method, checking with ATM/cash-back, represents an ATM or cash-back checking transaction (e.g., check card or debit card with cash-back option) and its actual account number that is linked to a checking account. Here, an ATM or cash-back checking transaction at POS or point of access can be processed using the actual account number. Thus, a proxy account number will not be used, and the transaction will be processed over the regional Electronic Funds Transfer (EFT) networks (e.g. Cirrus, Plus). The customer will be prompted for a PIN, and the transaction will be authorized accordingly over the EFT network(s). The customer can then receive the desired or allowable cash back from the transaction. Alternatively, a proxy account number can also be used for the checking with ATM/cash-back transaction in the same manner described earlier with regard to the other two methods, with the exception that the customer can receive the desired or allowable cash-back from the transaction. Also, it should be noted that other names may be used to represent the respective functionalities of the aforementioned payment choices as well.

The proxy account numbers in any or all of the above payment methods can be structured in an infinite number of ways to distinguish among themselves. For instance, each proxy account number may have one or a plurality of digits or characters that are different from other proxy account numbers. Alternatively, one or more digits can be added or deleted at the end of a base account number common to all proxy account numbers in order to form a proxy account number that is unique from other proxy account numbers and the consolidated account number. The particular proxy account number can be selected via the access device by an entity involved in a transaction with such proxy account number.

According to the preferred embodiments of the present invention, a default account (e.g., credit, DDA) may be selected by the customer for association with the primary account number that can be displayed on the access device. This primary account number may be used for mail order (MO), telephone order (TO), or Internet transactions. In the case of a plastic card access device, the primary account number may be embossed on the card, and that number can be used for imprinting at a manual (imprinter) POS. As an alternative, a separate application may be used on the Internet that replicates the proxy account schema in the on-line environment.

According to the preferred embodiments of the present invention, customers who have linked multiple source accounts to a single consolidated platform can transfer funds across accounts and different financial institutions. Potential types of fund transfers include, but are not limited to, balance transfers and recurring payments. The consolidated platform can also provide a consolidated statement of activities and balances of the underlying source accounts that can be used for budgeting and financial planning.

Although the consolidated platform has been described as an account to underlying payment accounts, it should be understood that such account can also be a "gateway" account to non-payment accounts (e.g., merchant loyalty accounts, membership accounts, and identification accounts) as well as payment accounts. For underlying non-payment accounts, each can be represented by a proxy account having a non-payment proxy account number.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

What is claimed is:

1. A system for providing access to a plurality of accounts for use in a transaction, the system comprising:

an access device comprising a non-transitory machine-readable storage medium configured to store a customer identifier and a plurality of proxy account numbers corresponding to a plurality of actual account numbers associated with the customer identifier, the plurality of actual account numbers stored on a host database of a first host system having a plurality of computing devices and associated with the customer identifier;

the host database of the first host system configured to store one or more database tables for one or more respective customers, wherein each respective database table corresponds to each respective customer according to the customer identifier of the respective customer, and wherein the database table identified by the customer identifier contains the plurality of actual account numbers corresponding to the plurality of proxy account numbers respectively; and a communication network configured to communicate a proxy account number from the access device to the first host system; and a processing server of the plurality devices of the first host system, the processing server configured to:

receive the proxy account number from the access device via the communication network;

identify in the host database, using the proxy account number associated with the customer identifier, the actual account number of the plurality of accounts corresponding to the customer identifier; and transmit via one or more networks a settlement request to an external device of a second host system external to the first host system, upon determining that the actual account number identified in the host database, is associated with an account of the second host system.

2. The system of claim 1, wherein the non-transitory machine-readable storage medium comprises magnetic encoding material.

3. The system of claim 2, wherein the access device is a card, wherein the magnetic encoding material comprises a plurality of magnetic stripes, wherein each of the magnetic stripes stores the proxy account number corresponding to one of the plurality of actual account numbers.

4. The system of claim 2, wherein the access device is a card, wherein the magnetic encoding material comprises a magnetic area at a single location on the card, wherein the magnetic area stores the proxy account number corresponding to one or more of the plurality of actual account numbers.

5. The system of claim 1, wherein the access device is selected from the group consisting of a computer terminal, a landline phone, a cellular phone, a personal digital assistant, a magnetic-stripe card, a smart card, a television, a touch screen, an interactive voice terminal, an interactive touchtone terminal, a video screen, and biometric identification means.

6. The system of claim 1, wherein the proxy account number and the plurality of actual account numbers are administered by the first host system.

7. The system of claim 1, wherein at least one of the plurality of actual account numbers is administered by the second host system.

8. The system of claim 1, wherein the proxy account number corresponding to one of the plurality of actual account numbers can be chosen for retrieval at a point-of-access terminal.

9. The system of claim 1, wherein the plurality of actual account numbers corresponds to a consumer payment account.

10. The system of claim 1, wherein the plurality of actual account numbers corresponds to a consumer non-payment account.

11. The system of claim 1, wherein the plurality of actual account numbers corresponds to a consumer payment account and a consumer non-payment account.

12. A computer-implemented method comprising:

receiving, by a computer of a first host system, from one or more computing devices a plurality of actual account numbers;

storing, by the computer, into a database of the first host system, an identification (ID) number associated with the plurality of actual account numbers, and a plurality of proxy account numbers corresponding to the plurality of actual account numbers, wherein the database of the first host system configured to store one or more database tables for one or more respective customers, wherein each respective database table corresponds to each respective customer according to the customer identifier of the respective customer, and wherein the database table identified by the customer identifier contains the plurality of actual account numbers corresponding to the plurality of proxy account numbers respectively;

receiving, by the computer, the ID number and a proxy account number from an access device;

identifying, by the computer, in the database of the first host system, an actual account number corresponding to the proxy account number received from the access device, based upon the ID number received from the access device; and transmitting, by the computer, via one or more networks a settlement request to an external device of a second host system external to the first host system, upon determining that the actual account number identified in the database of the first host system, is associated with an account of the second host system.

13. The method of claim 12, wherein the plurality of actual account numbers are administered by different host systems.

14. The method of claim 13, wherein the different host systems belong to different financial institutions.

15. The method of claim 12, wherein the access device comprises magnetic encoding material.

16. The method of claim 12, wherein the access device is selected from the group consisting of a computer terminal, a landline phone, a cellular phone, a personal digital assistant, a magnetic-stripe card, a smart card, a television, a touch screen, an interactive voice terminal, an interactive touchtone terminal, a video screen, and biometric identification means.

17. The method of claim 12, wherein at least one of the plurality of actual account numbers is administered by the first host system.

18. The method of claim 12, wherein the settlement request corresponds to a purchase of a product or service with a fund associated with the actual account number.

19. The method of claim 12, wherein the settlement request corresponds to a modification of information associated with the actual account number.

20. The method of claim 12, wherein the settlement request corresponds to a fund transfer to or from a fund associated with the actual account number.

21. The method of claim 12, wherein the transmitting is performed on a periodic basis.

* * * * *